Patented Aug. 25, 1936

2,051,814

UNITED STATES PATENT OFFICE 2,051,814

TREATMENT OF MOTOR FUEL

Wayne L. Benedict, Chicago, Ill., assignor to Universal Oil Products Company, Chicago, Ill., a corporation of Delaware No Drawing. Application August 25, 1933, Serial No. 686,782

6 Claims. (Cl. 44—9)

This invention refers more particularly to the treatment of cracked motor fuel produced from the heavier portions of petroleum and other similar materials although it has application also to analogous straight run products.

In a more specific sense the invention has reference to the treatment of motor fuel by means adapted to preserve its valuable properties while under storage conditions, particularly when exposed to light and oxidizing influences.

Cracked motor fuel fractions which have not been subjected to refining treatments stand generally in contrast to straight run gasolines in several respects. They frequently have a higher sulfur content, which accounts for their unpleasant odor, and they are subject to rapid deterioration on standing due to polymerization and condensation reactions among the various types of olefins which constitute a substantial percentage of the hydrocarbons which go to make up their total composition. To offset some of these disadvantages the cracked products have a uniformly higher knock rating than straight run products, though this may also depreciate to some extent along with the loss of color and the development of gums which usually occur simultaneously though not necessarily so.

In rendering gasolines sufficiently stable to permit their storage over reasonable periods of time two general courses of action are open, the first consisting in treating out the offending constituents by means of chemicals such as sulphuric acid and polymerization reactions induced by various solid contact materials and the second consisting in using small quantities of antioxidants or inhibitors to stabilize the more reactive di- and tri-olefins and render them less readily polymerized under the influence of oxygen. It is with processes of the latter character involving the use of a particular class of inhibiting materials that the present invention is concerned.

In one specific embodiment the present invention comprises the use of alkali metal phenolates in cracked gasolines to retard the development of undesirable color therein.

Phenolates (or phenoxides) are compounds formed by replacing the hydroxyl hydrogen atoms of phenols by metals. The alkali metal phenolates are readily obtained by dissolving a phenol in either fused alkalies or aqueous solutions of alkalies, the latter alternative requiring the evaporation of the solvent to obtain the phenolate as a residue. The reactions are usually complete and it is only necessary to interact the required molecular proportions of the phenol and the alkali. A considerable series of phenolates may be prepared in this manner corresponding to the known mono and poly hydroxyphenols and their ring-substituted derivatives. For purposes of reference the following table of some of the lower molecular weight phenols is introduced from which phenolates for use according to the present process may be prepared by the method briefly outlined.

*Low molecular weight phenols*

Phenol, mono hydroxybenzol
Pyrogallol, ortho dihydroxybenzol
Resorcinol, meta dihydroxybenzol
Hydroquinone, para dihydroxybenzol
Pyrogallol, 1,2,3 trihydroxybenzol
Oxyhydroquinone, 1,2,4 trihydroxybenzol
Phloroglucinol, 1,3,5 trihydroxybenzol It will be obvious from a consideration of the few representative phenols given in the above table, bearing in mind the fact that many derivatives are possible by substituting the ring hydrogens with various alkyl and aryl radicals, that the invention comprises the use of a large number of compounds. However, compounds thus prepared will be distinct in their inhibiting or retarding action when used in unstable gasolines and will not be equivalent in their action to other compounds which may be employed alternatively. Numerical examples, which will be introduced at a later point, will serve to illustrate the non-equivalency of some phenolates. The choice of a suitable color inhibitor in commercial practice will be determined by the usual considerations of cheapness and availability, so that as a rule the simpler compounds such as the sodium and potassium compounds with phenol may be utilized. However, more or less crude mixtures of phenols may sometimes be available from which color inhibitors of a mixed character are derivable, and furthermore, special compounds may have extraordinary potency in certain gasolines.

The exact course and type of reactions leading to the formation of colored bodies in gasolines is less easily determinable than reactions leading to the formation of gums, which latter reactions are only partially understood though they are apparently due to condensation and polymerization reactions among the more sensitive and reactive olefins. It may be that the colored bodies result from the polymerization of extremely sensitive hydrocarbons of an unsaturated character which polymerize with great rapidity in the presence of very minute amounts of oxygen or possibly sulphur. The products of this primary reaction may be peroxides, or may even possess an acid character which is effectively neutralized by the use of alkali metal phenolates although it is difficult to obtain positive analytical confirmation of this fact. It is also reasonable to suppose that an alkali metal phenolate added to a gasoline susceptible to oxidizing influences functions in preferentially absorbing oxygen and preventing the formation of extremely unstable peroxides.

While I have determined that, as a general rule, the alkali metal phenolates exert a definite retarding action upon the development of undesirable color in gasoline, it may happen that they will also retard somewhat the development of gums and heavy polymers and further they may arrest the depreciation in anti-knock value which sometimes occurs due to loss of olefins by polymerization. Many cases arise, where the use of a relatively small amount of a color inhibitor selected from the present class is sufficient to retard the development of color over any practical period of time and also exert a beneficial influence in blowing up gum formation and depreciation in anti-knock value. When necessary the color inhibitor may be used in conjunction with a gum inhibitor of greater value in this respect, particularly in cases where the gum inhibitor is not only a poor color inhibitor but even tends to develop color per se.

In applying the present class of inhibiting materials to color-unstable gasolines, they may be added directly or in solution in solvents, the advantage of the latter method being in general increased assurance of quick distribution of the inhibitor through the gasoline and assurance of its immediate and permanent solubility, particularly in cases where gasolines tend to cloud or haze when going off color. Different solvents such as alcohol, benzol, et cetera, may be employed to make concentrates of the inhibitors and also mixed solvents may be employed. The invention is not limited to the use of any particular solvent but may utilize any one found suitable.

The amounts of phenolates necessary for sufficiently retarding color formation in cracked gasolines are usually of a low order corresponding to approximately 0.001 to 0.01%, though this range may be exceeded in either direction if desired or if found expedient. As an example of results obtainable by the use of the particular class of color inhibitors comprised within the scope of the present invention, the following data is presented, though it is to be understood that this is merely illustrative and that the scope of the invention is not limited thereby.

The inhibitors shown in the following table were dissolved in a solvent mixture consisting of 50% by volume of butyl alcohol and 50% by volume of benzol. Sufficient amounts of the simple sodium and potassium phenolates were dissolved so that each cubic centimeter of the inhibitor concentrate contained 36 mg. of phenolate. In the case of the other phenolates shown the concentration was 46 mg. of phenolate per cubic centimeter of concentrate.

The inhibiting compounds were dissolved in a cracked gasoline subject to color deterioration by using proper volumes of the concentrated solutions and tests as to color stability were run in a bomb containing air at a temperature of approximately 212° F. and at the vapor pressure of the gasoline, the tests being interrupted at the time intervals shown in the table to determine the change in color.

*Phenolates as color inhibitors*

| Inhibitor | Percent | Bomb color test | | |
|---|---|---|---|---|
| | | 3 hr. | 5 hr. | 7 hr. |
| Blank | | 21 | | |
| Sodium phenolate | .0025 | 30 plus | 28 | 19 |
| Sodium phenolate | .00125 | 30 plus | 26 | 17 |
| Potassium phenolate | .00125 | 30 plus | 23 | |
| Potassium phenolate | .0025 | 30 plus | 26 | |
| Sodium butyl phenolate | .0025 | 28 | | |
| Sodium o-chlor phenolate | .0025 | 26 | | |
| Sodium p-chlor phenolate | .0025 | 30 plus | | |
| Sodium o-cresylate | .0025 | 30 plus | | |
| Sodium p-cresylate | .0025 | 30 plus | | |
| Sodium thymolate | .0025 | 30 plus | | |
| Sodium carvacrolate | .0025 | 30 plus | | |
| Sodium butyl resorcinolate | .0025 | 28 | Pink cast | Pink cast |

The above set of tests shows the value of the materials at present under consideration as color inhibitors and indicates that color inhibition may be secured by the use of very minute quantities of the materials. It also shows that there is some variability in the action of the different phenolates, which would also vary in a different manner in the case of other gasolines.

The character of the present invention is obvious from the foregoing specification and the numerical data adduced in its support, but the generally broad scope is not limited by the exact details of the description or the numerical data presented.

I claim as my invention:

1. Motor fuel comprising gasoline containing color-forming olefins and a small amount of a phenolate capable of inhibiting or substantially reducing the transformation of said olefins into colored bodies.

2. Motor fuel comprising gasoline containing color-forming olefins and a small amount of an alkali metal phenolate as an inhibitor against the transformation of said olefins into colored bodies.

3. Motor fuel comprising cracked gasoline containing color-forming olefins and a small amount of a phenolate capable of inhibiting or substantially reducing the transformation of said olefins into colored bodies.

4. Motor fuel comprising cracked gasoline containing color-forming olefins and a small amount of an alkali metal phenolate as an inhibitor against the transformation of said olefins into colored bodies.

5. A method for treating hydrocarbon motor fuel containing olefins which, in unoxidized form, do not objectionably discolor the fuel but which form objectionable colored bodies in the fuel under oxidizing influences, said method comprising the incorporation into the fuel, as a permanent ingredient thereof, a relatively small but sufficient amount of a phenolate to inhibit the transformation of said olefins into colored bodies during exposure of the fuel to oxidizing influences.

6. A method for treating hydrocarbon motor fuel containing olefins which, in unoxidized form, do not objectionably discolor the fuel but which form objectionable colored bodies in the fuel under oxidizing influences, said method comprising inhibiting the transformation of said olefins into colored bodies by incorporating into the fuel, as a permanent ingredient thereof, a relatively small amount of an alkali metal phenolate.

WAYNE L. BENEDICT.